(12) United States Patent
Baek

(10) Patent No.: US 6,310,722 B1
(45) Date of Patent: *Oct. 30, 2001

(54) LENTICULAR LENS SHEET AND PROJECTION SCREEN USING THE SAME

(75) Inventor: Jong Soo Baek, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,804

(22) Filed: Jul. 27, 1998

(30) Foreign Application Priority Data

Jul. 31, 1997 (KR) .................................................. 97-36359

(51) Int. Cl.$^7$ ..................................................... G03B 21/60
(52) U.S. Cl. ............................................................ 359/455
(58) Field of Search .................................. 359/452, 461, 359/459, 128, 457, 455; 350/128; 428/141; 156/99

(56) References Cited

U.S. PATENT DOCUMENTS 3,966,301 * 6/1976 Brown ................................. 350/128
5,066,099 * 11/1991 Yoshida et al. ..................... 359/457
5,837,346 * 11/1998 Langille et al. ..................... 428/144

FOREIGN PATENT DOCUMENTS

| 51-41528 | 4/1976 | (JP) . | |
|---|---|---|---|
| 58-192023 | 11/1983 | (JP) | ................................. G03B/21/62 |
| 59-119341 | 7/1984 | (JP) | ................................. G03B/21/62 |
| 64-24241 | 1/1989 | (JP) | ................................. G03B/21/62 |
| 1-302204 | 12/1989 | (JP) . | |
| 2-22637 | 1/1990 | (JP) . | |
| 2-115828 | 4/1990 | (JP) . | |
| 36-4701 | 3/1991 | (JP) . | |
| 56-1120 | 3/1993 | (JP) . | |

* cited by examiner

Primary Examiner—Safet Metjahic
Assistant Examiner—E. P. LeRoux
(74) Attorney, Agent, or Firm—Fleshner & Kim, LLP

(57) ABSTRACT

A lenticular lens sheet for enlarging vertical and horizontal view angles and minimizing a color shift. In the sheet, incident side lenses formed in a half-cylinder shape are arranged in parallel to converge an incident light. The light converged by each of the half-cylinder shaped lenses is diffused in the vertical and horizontal direction by prism shaped output side lenses.

16 Claims, 3 Drawing Sheets

LENTICULAR LENS SHEET AND PROJECTION SCREEN USING THE SAME

BACKGROUND OF THE INVENTION

1. Field of the Invention

This invention relates to a lenticular lens sheet for enlarging a view angle. Also, this invention is directed to a projection screen that is adapted to assure a great view angle as well as to minimize a color shift and a white non-uniformity using the lenticular lens sheet.

2. Description of the Prior Art

Recently, there has been spread a projection system enlarging a small picture in order to satisfy a user's desire for a large picture. The projection system uses a projection screen to enlarge and image a small picture revived by means of a cathode ray tube(CRT) or a liquid crystal display(LCD). Such a projection screen for imaging a large picture must assure as great view angle as possible so as to enlarge a visual area. To this end, the projection screen uses a lenticular lens sheet.

For example, in a projection system as shown in FIG. 1, each picture on red(R), green(G), and blue(B) CRTs 11, 12 and 13 are enlargedly cast on a projection screen 19 by means of corresponding projective lens 14, 15 and 16, thereby imaging a large color picture on the projection screen 19. At this time, because lights progressing from each projective lens 14, 15 and 16 to the projection screen 19 are diffused, lights received to the incident face (i.e., front surface) of the projection screen 19 have different incidence angles in accordance with their positions on the projection screen 19. Due to this, a distribution of lights output from the output face (i.e., rear surface) of the projection screen 19 becomes non-uniform, and a light quantity in the incident face of the projection screen 19 becomes different from that in the output face thereof. In order to overcome such a light quantity difference and such a non-uniform light distribution, a Fresnel lens sheet 17 having prism type lenses are provided in the incident face of the projective lens 19. This Fresnel lens sheet 17 may overcome the light quantity difference and the non-uniform light distribution, but has a disadvantage in that it causes a small view angle of the projection screen 19.

Further, projective center axes extending from the center of each projective lens 14, 15 and 16 to the center of the projection screen 19 usually make an angle more than 8°. Accordingly, light rays incident to a point on the projection screen 19 from each projective lens 14, 15 and 16 have different angles each other with respect to the surface of the projection screen 19. Due to this, there occur a phenomenon called "color shift", in which a color of a picture displayed on the projection screen 19 becomes different depending upon a viewing position, and a phenomenon called "white uniformity deterioration", in which same color is displayed differently depending upon a position on the projection screen 19.

In order to solve such problems, the projection screen 19 includes a lenticular lens sheet 18 provided in the output face (i.e., rear surface) thereof. The lenticular lens sheet 18 converges lights passing through the projection screen 19 and then diverges the converged lights, thereby enlarging a view angle of the projection screen 19 as well as preventing the color shift and the white uniformity deterioration. To this end, as shown in FIG. 2, the lenticular lens sheet 18 includes half-cylinder shape lenses 21 arranged in parallel in a direction perpendicular to the incident face of a wave guide film 20, hereinafter referred to as "incident side lenses", and half-cylinder shape lenses 22 arranged in a direction perpendicular to the output face of the wave guide film 20, hereinafter referred to as "output side lenses". Each incident side lens 21 converges a light on the surface of a corresponding output lens 22, and each output side lens 22 diverges a light in the horizontal direction at the surface thereof. An angle at which a light is diverged on the surface of the output side lens 22 defines a view angle. In order that the lenticular lens sheet 18 having such incident side lenses 21 and such output side lenses 22 may assure a horizontal view angle and prevent the color shift and the white uniformity deterioration, the surfaces of the incident side lenses 21 and the surfaces of the output side lens 22 must be defined to satisfy the following formula (1):

$$Z(x) = \frac{Cx^2}{1 + (1 - (k+1)C^2x^2)^{1/2}} \quad (1)$$

wherein C is a curvature of lens; k is a conic constant; and x and Z represent positions in the x axis and the z axis, respectively. Further, curved surfaces of the incident and output side lenses 21 and 22 according to the above formula (1) are shown in FIG. 3. In the lenticular lens sheet 18 in which the output lenses 22 are formed in such a half-cylindrical element, a horizontal view angle fails to be enlarged beyond a certain limit value. When the lenticular lens sheet having such a structure is used for the projection screen, it is difficult to reduce the color shift and the white non-uniformity to less than a certain limit value.

Light diffusive particles 24 are distributed at the interior of the wave guide film 20 in the lenticular lens sheet 18. These particles 24 diffracts a light passing through the wave guide film 20 to enlarge a vertical view angle. When the particles 24 are injected too much to the wave guide film 20, however, an amount of light transmitting the output side lens 22 via the wave guide film 20 becomes small. Accordingly, an image displayed on the output side lens 20 is blurred. In order to solve this problem, there has been used various schemes, i.e., a method that adds a lens sheet having half-cylinder shape lenses arranged in parallel in the horizontal direction to the surfaces of the output side lenses 22, a method that presses a thermal plastic resin film having light diffusive particles distributed and defined by thin bands with prominence and depression onto the surfaces of the output side lenses 22, or a method that grounds the surfaces of the output side lenses 22 using a sandpaper so as to smooth them. However, such methods complicate the structure and the manufacturing process of the lenticular lens sheet.

As described above, in the conventional lenticular lens sheet, it was impossible to enlarge the vertical and horizontal view angles beyond a certain limit value and it was difficult to raise a light utility factor above a certain limit value, due to its structural affect. Also, the conventional lenticular lens sheet failed to reduce the color shift and the white non-uniformity when it was used for the projection screen. Moreover, the conventional lenticular lens sheet may act as a cause of forbidding the projection screen to provide a bright picture.

SUMMARY OF THE INVENTION

Accordingly, it is an object of the present invention to provide a lenticular lens sheet that is adapted to enlarge vertical and horizontal view angles.

Further object of the present invention is to provide a lenticular lens sheet that is adapted to raise a light utility factor.

Another object of the present invention is to provide a projection screen that is adapted to enlarge view angles in the vertical and horizontal directions thereof as well as to minimize the color shift.

Still another object of the present invention is to provide a projection screen that is adapted to supply a bright picture.

In order to achieve these and other objects of the invention, a lenticular lens sheet according to one aspect of the present invention includes incident side lenses arranged in parallel to converge an incident light, the incident side lens having a half-cylinder shape; and output side lenses formed in a prism shape to diffuse a light converged by each of the incident side lenses in the vertical and horizontal directions.

A lenticular lens sheet according to another aspect of the present invention includes incident side lenses arranged in parallel to converge an incident light, the incident side lens having a half-cylinder shape; and output side lens portion provided with embossing for diffusing a light converged by the incident side lenses in the vertical and horizontal directions.

A projection screen according to yet another aspect of the present invention includes a Fresnel lens sheet for converting a diffusive light from a projective lens into a parallel light; and a lenticular lens sheet for enlarging a view angle, the lenticular lens sheet having incident side lenses formed in a half-cylinder shape to converge a light from the Fresnel lens sheet, and output side lenses formed in a prism shape to diffuse the light converged by the incident side lenses in the horizontal and vertical directions.

A projection screen according to still another aspect of the present invention includes a Fresnel lens sheet for converting a diffusive light from a projective lens into a parallel light; and a lenticular lens sheet for enlarging a view angle, the lenticular lens sheet having incident side lenses formed in a half-cylinder shape to converge a light from the Fresnel lens sheet, and output side lens portion provided with embossing for diffusing the light converged by the incident side lenses in the horizontal and vertical directions.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
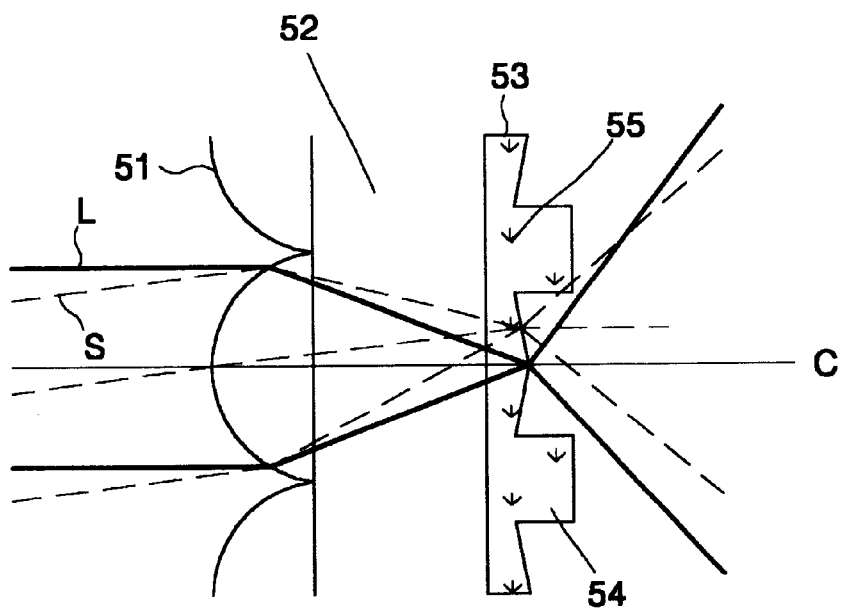
FIG. 4 is a schematic view of a lenticular lens sheet according to an embodiment of the present invention.

Referring to FIG. 4, there is shown a lenticular lens sheet according to an embodiment of the present invention. The lenticular lens sheet includes incident side lenses 51 arranged in parallel in a direction perpendicular to one surface of a wave guide film 52, and output side lenses 53 in parallel in a direction perpendicular to other surface of the wave guide film 52. Each incident side lens 51 is made from transparent light hardening resin to have a half-cylinder shape. Also, each incident side lens 51 has a pitch of 0.3 mm and a thickness of 0.5 mm. Each incident side lens 51 has surfaces curved in a curvature radius of 0.1386 mm and a conic constant of −0.42. Each of such incident side lens focuses lights to converge lights incident to the wave guide film 52 around the surface of the output side lens 53. The wave guide film 52 are made from a resin having a refractive index similar to the transparent light hardening resin forming the incident side lens 51 in such a manner to have a thickness of 0.25 mm. The output side lenses 53 are formed in a shape of triangular prism from a transparent light hardening resin in such a manner to have the same refractive index as the incident side lens 51. A vertical angle portion of the output side lens 53 is rounded to make a curved surface. Inclined surfaces in the output side lens 53 are formed to have a slope of 17.6°. Also, each output side lens 53 is formed to have a pitch of 0.3 mm and a thickness of 0.112 mm. Each of such output side lenses 53 disperses lights focused by means of the incident side lens 51 in the horizontal direction, thereby enlarging a horizontal view angle.

Further, light absorbing members 54 are provided between the output side lenses 53, and light diffusive particles 55 are distributed at the interior of the light absorbing members 54 and the output side lenses 53. The light absorbing members 54 prevent a deterioration of picture by absorbing a light incident to the wave guide film 52 from the exterior of the output side lenses 53 and a light reflected by means of the output side lenses 53. Also, the light absorbing members 54 are provided at the necks defined by the incident side lenses 51 and the output side lenses 53 to prevent the lenticular lens sheet from being broken easily. The light diffusive particles 55 refract lights progressing from the wave guide film to the surfaces of the output side lenses 53, thereby enlarging a vertical view angle and a horizontal view angle. In order to obtain more enlarged view angle, the light diffusive particles 55 are desirable to have a diameter of 3 to 30 μm and a refractive index above 0.01 greater than the light diffusive resin forming the output side lens 53. Further, the light diffusive particles 55 may be distributed in the interior of the incident side lenses 51 and the wave guide film so as to enhance a light utility factor of the lenticular lens sheet. In this case, the wave guide film 52 includes particles 55 more than the output side lenses 53, and the incident side lens 51 includes particles 55 more than the wave guide film 52. The light diffusive particles 55 show more and more amount when forwarded to the incident side lens 51 from the output side lens 51. The ratio of a light quantity incident to the incident side lens 51 to a light quantity output from the output side lens 53 is raised by the light diffusive particles 55 distributed in the above manner, thereby displaying brighter picture.

Figure 1:
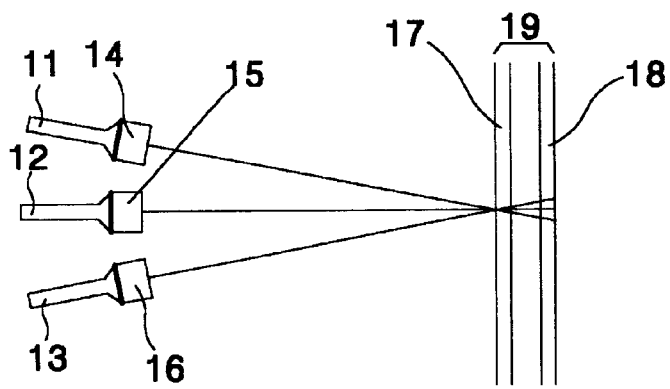
FIG. 1 is a schematic view of a conventional projection system.
Figure 2:
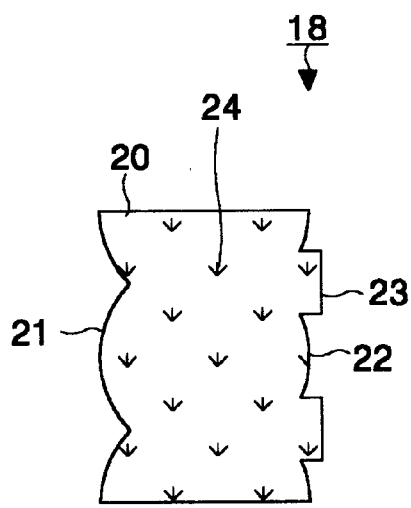
FIG. 2 is an enlarged view of a part of the lenticular lens sheet shown in FIG. 1.
Figure 3:
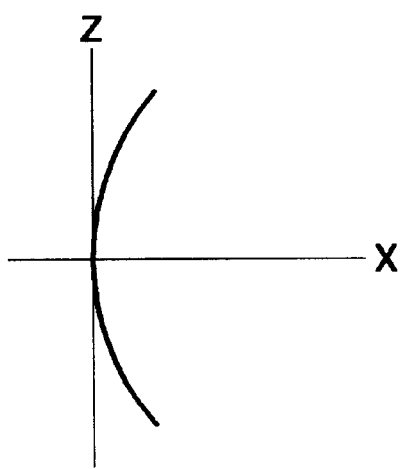
FIG. 3 illustrates a curved surface of a lens on the lenticular lens sheet determined by the formula (1)

In the lenticular lens sheet according to an embodiment of the present invention having in the above-mentioned structure, a light L received in a direction C perpendicular to the wave guide film 52 is diffused by focusing onto the vertical angle portion of the output side lens 53; while a light S incident obliquely to the wave guide film 52 is refracted and diffused from the inclined surface thereof toward the vertical angle portion thereof by focusing onto the inclined surface of the output side lens 53. Accordingly, lights progressing from the surface of the output side lens 53 to the light absorbing member 54 are reduced, and further the ratio of a light quantity incident to the incident side lenses 51 to a light quantity output to the output side lenses 53 increases. As a result, the lenticular lens sheet according to an embodiment of the present invention is capable of providing brighter picture as well as assuring the horizontal view angle and the vertical view angle at least 10% greater than conventional lenticular lens sheet. Also, since the lenticular lens sheet according to an embodiment of the present invention converges lights incident obliquely to the wave guide film 52 into the vertical angle portion when it is used for the projection screen 19 in the projection system including three CRTs 11 to 13 and three projective lenses 14 to 16 as shown in FIG. 1, it does almost not appear the color shift phenomenon and can obtain the white uniformity.

Figure 5:
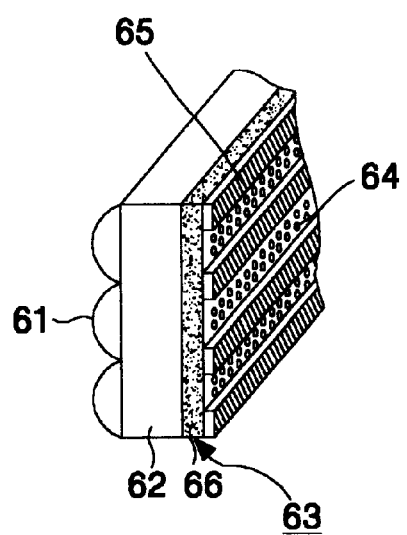
FIG. 5 is a schematic view of a lenticular lens sheet according to another embodiment of the present invention.
Figure 6A:
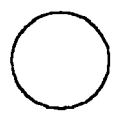
FIGS. 6A to 6F illustrate shapes of the embossing shown in FIG. 5.
Figure 6B:
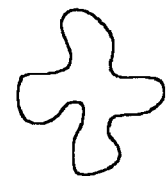
Figure 6C:
Figure 6D:
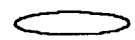
Figure 6E:
Figure 6F:
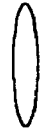

Referring now to FIG. 5, there is shown a lenticular lens sheet according to another embodiment of the present invention. The lenticular lens sheet includes incident side lenses 61 arranged in parallel in a direction perpendicular to one surface of a wave guide film 62, and output side lens portion 63 provided in other surface of the wave guide film 62. Each incident side lens 61 is made from a transparent light hardening resin to have a half-cylinder shape. Also, each incident side lens 61 has a pitch of 0.3 mm and a thickness of 0.5 mm. Each incident side lens 61 has surfaces curved into a curvature radius of 0.1386 mm and a conic constant of −0.42. Each of such incident side lenses 61 focuses lights to converge lights incident to the wave guide film 62 around the surface of the output side lens portion 63. The wave guide film 62 are made from a resin having a refractive index similar to the transparent light hardening resin forming the incident side lens 61 in such a manner to have a thickness of 0.25 mm. The output side lens portion 63 is formed in a thickness of 0.112 mm from a transparent light hardening resin in such a manner to have the same refractive index as the incident side lens 51. Embossing 64 are defined on the surface of the output side lens portion 63. Each embossing 64 disperses a light received via the incident side lens 61 and the wave guide film 62 in the vertical and horizontal directions, thereby enlarging vertical and horizontal view angles. Also, the embossing 64 are formed in various shapes in accordance with a relative dimension of the vertical view angle to the horizontal view angle. When the horizontal view angle and the vertical view angle have symmetrical dimensions each other, that is, when the horizontal view angle is equal to the vertical view angle, the embossing 64 are formed in a circular shape as shown in FIG. 6A, or in an amorphous shape as shown in FIG. 6B. Otherwise, when the horizontal view angle and the vertical view angle are intended to have non-symmetrical dimensions each other, that is, when the horizontal view angle is intended to be different from the vertical view angle, the embossing 64 are formed in ellipse shapes shown in FIGS. 6C to 6F. The embossing 64, in which longitudinal axes are positioned in the horizontal direction as shown in FIGS. 6C and 6D, provide a horizontal view angle larger than a vertical view angle. On the other hand, the embossing 64, in which longitudinal axes are positioned in the vertical direction as shown in FIGS. 6E and 6F, provide a horizontal view angle smaller than a vertical view angle. The difference between the horizontal view angle and the vertical view angle increases in proportion to a ratio of the longitudinal axis to the short axis in the embossing 64. Such embossing 64 have dimensions of several $\mu$m and are arranged on the surface of the output side lens portion 63 in a random basis.

Further, light absorbing members 65 are provided on the surface of the output side lens portion 63 in each pitch distance of the incident lenses 61. Light diffusive particles 66 are distributed at the interior of the light absorbing members 65 and the output side lens portion 63. The light absorbing members 65 absorb a light incident to the wave guide film 62 from the exterior of the output side lens portion 63 and a light reflected by the embossing 64, thereby preventing a deterioration of picture. Also, the light absorbing members 65 are provided at the necks defined by the incident side lenses 61 to prevent the lenticular lens sheet from being broken easily. The light diffusive particles 66 refract lights progressing from the wave guide film 62 to the surfaces of the output side lens portion 63, thereby enlarging a vertical view angle and a horizontal view angle. To this end, the light diffusive particles 66 are desirable to have a diameter of 3 to 30 $\mu$m and a refractive index above 0.01 greater than the light diffusive resin forming the output side lens portion 63. Further, the light diffusive particles 66 may be distributed in the interior of the incident side lenses 61 and the wave guide film 62 so as to enhance a light utility factor of the lenticular lens sheet. In this case, the wave guide film 62 includes particles 66 more than the output side lens portion 63, and the incident side lens 61 includes particles 66 more than the wave guide film 52. The light diffusive particles 66 show more and more amount when forwarded to the incident side lens 61 from the output side lens portion 63. The ratio of a light quantity incident to the incident side lens 61 to a light quantity output from the output side lens portion 63 is raised by the light diffusive particles 66 distributed in the above manner, thereby displaying brighter picture.

In the lenticular lens sheet according to an embodiment of the present invention having in the above-mentioned structure, a light received in a direction perpendicular to the wave guide film 62 and a light incident obliquely to the wave guide film 62 are diffused by means of the embossing 64. Accordingly, lights progressing from the surface of the output side lens portion 63 to the light absorbing member 65 are reduced, and further the ratio of a light quantity incident to the incident side lenses 61 to a light quantity output from the output side lens portion 63 increases. As a result, the lenticular lens sheet according to an embodiment of the present invention is capable of providing brighter picture as well as assuring the horizontal view angle and the vertical view angle at least 10% greater than conventional lenticular lens sheet. Also, since the lenticular lens sheet according to an embodiment of the present invention disperses lights incident obliquely to the wave guide film 62 into a partially divided state by means of the embossing 64 when it is used for the projection screen 19 in the projection system including three CRTs 11 to 13 and three projective lenses 14 to 16 as shown in FIG. 1, it does almost not appear the color shift phenomenon and can obtain the white uniformity.

As described above, in the lenticular lens sheet according to the present invention, a light is dispersed by means of the prism shaped lens or the embossing. Accordingly, the lenticular lens sheet according to the present invention is capable of raising the light transmissivity as well as enlarging the horizontal and vertical view angles. Further, when the lenticular lens sheet according to the present invention is used for the projection screen in the color projection system, it is capable of preventing the color shift as well as providing the white uniformity.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A lenticular lens sheet, comprising:

half cylindrical lenses arranged in parallel to converge incident light;

a wave guide film for receiving and transmitting the converged incident light from the half cylindrical lenses wherein the wave guide film is formed from a material different from the half cylindrical lenses; and output side lenses arranged to receive the incident light transmitted by the wave guide film, said output side lenses adapted to diffuse the transmitted incident light in any one of vertical and horizontal directions, wherein each of the output side lenses comprise a light converging face having a rounded lens portion and an inclined planar lens portion;

wherein the half cylindrical lenses and the output side lenses are formed of a light hardening resin and are arranged on front and rear faces of the wave guide film, respectively.

2. The lenticular lens sheet as claimed in claim 1, further comprising light absorbing members positioned between the output side lenses.

3. The lenticular lens sheet as claimed in claim 1, wherein each of said output side lenses comprises light diffusive particles distributed to refract a light.

4. The lenticular lens sheet as claimed in claim 1, wherein the waveguide film has a refractive index similar to that of the half cylindrical lenses and the output side lenses.

5. The lenticular lens sheet as claimed in claim 4, wherein said half cylindrical lenses, said wave guide film and said output side lenses comprise light diffusive particles for refracting light.

6. The lenticular lens sheet as claimed in claim 5, wherein a concentration of the light diffusive particles decreases from the half cylindrical lenses to the output side lenses.

7. The lenticular lens sheet as claimed in claim 5, wherein said light diffusive particles have a refractive index above 0.01 greater than that of the half cylindrical lenses.

8. The lenticular lens sheet as claimed in claim 7, wherein said light diffusive particle has a diameter of 3 to 30 μm.

9. A lenticular lens sheet, comprising:

half cylindrical lenses arranged in parallel to converge incident light;

a wave guide film for receiving and transmitting the converged incident light from the half cylindrical lenses, wherein the wave guide film is formed from a material different from the half cylindrical lenses; and output side lenses arranged to receive the incident light transmitted by the wave guide film, said output side lenses adapted to diffuse the transmitted incident light in any one of vertical and horizontal directions, wherein each of the output side lenses comprise a light converging face with embossing and a non-converging face;

wherein the half cylindrical lenses and the output side lenses are formed of a light hardening resin and are arranged on front and rear faces of the wave guide, respectively.

10. The lenticular lens sheet as claimed in claim 9, wherein said embossing is formed in any one of amorphous shape, circular shape and ellipse shape.

11. The lenticular lens sheet as claimed in claim 9, wherein said output side lens portion includes light diffusive particles distributed to refract a light.

12. The lenticular lens sheet as claimed in claim 9, wherein said wave guide film has a refractive index similar to that of the half cylindrical lenses and the output side lenses.

13. The lenticular lens sheet as claimed in claim 9, wherein said half cylindrical lenses, said wave guide film and said output side lenses comprise light diffusive particles for refracting light.

14. The lenticular lens sheet as claimed in claim 13, wherein a concentration of the light diffusive particles decreases from the half cylindrical lenses to the output side lenses.

15. The lenticular lens sheet as claimed in claim 13, wherein said light diffusive particles have a refractive index above 0.01 greater than that of the half cylindrical lenses.

16. The lenticular lens sheet as claimed in claim 15, wherein said light diffusive particle has a diameter of 3 to 30 μm.

* * * * *